United States Patent [19]
Hoffmann et al.

[11] Patent Number: 5,347,627
[45] Date of Patent: Sep. 13, 1994

[54] GRAPHICAL USER INTERFACE INCLUDING DYNAMIC SIZING AND SPACING

[75] Inventors: Robert P. Hoffmann, Endwell, N.Y.; Jerry W. Malcolm, Austin, Tex.; John D. Montgomery, Binghamton, N.Y.; Steve S. Stone, Austin, Tex.

[73] Assignee: International Business Machines Corporation, Armonk, N.Y.

[21] Appl. No.: 864,766

[22] Filed: Apr. 7, 1992

[51] Int. Cl.$^5$ .......................... G06F 15/00; G06F 3/14
[52] U.S. Cl. .................................................. 395/157
[58] Field of Search .............. 395/155, 161, 156, 157, 395/158, 159; 364/419.1, 419.14; 345/119, 120

[56] References Cited

U.S. PATENT DOCUMENTS

| | | | |
|---|---|---|---|
| 4,791,556 | 12/1988 | Vilkaitis | 364/200 |
| 5,081,592 | 1/1992 | Jenq | 364/487 |
| 5,179,657 | 1/1993 | Dykstal et al. | 395/161 |
| 5,228,123 | 7/1993 | Heckel | 395/155 |

*Primary Examiner*—Phu K. Nguyen
*Attorney, Agent, or Firm*—Richard M. Goldman

[57] ABSTRACT

A method of defining, creating, or editing a graphical user interface panel. According to the method, a user opens a graphical user interface source code file. This source code file contains an entry for the user interface panel and for each object, as an icon, an action bar, or the like, within the panel. The object entries include the size and location of the object. The user edits the source code file in a dynamic sizing, What You See Is What You Get environment. A compiler compiles the graphical user interface source code file to form a graphical user interface object code file. The compiler also updates the size and location object entries of each graphical object, dynamically sizing the size and location object entries.

3 Claims, 5 Drawing Sheets

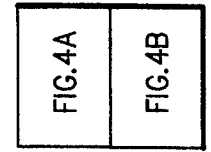

```
:ui.
:helpdef 'HelpDef Help Title' label=HLPDEF refsymbol=hlpdef.
    This help is for an item to be added to the list at runtime.
:/helpdef.

:textdef text='List item added' text.label=ADDITEM refsymbol=additem.

:windowdef 'User Interface Example' defaultsysmenu=yes initialstate=default modal=no name=uiclass
sizeable=yes tasklist=yes maximizeable=yes.

:helptext 'UI Panel Help'.
    :/helptext.
    :menugroup type=actionbar.
        :menuitem type=file.
        :menugroup.
                        :menuitem 'Exit\tF3' id=mexit validate=yes dismisswindow=yes.
        :/menugroup.
        :menuitem type=help.
        :menugroup.
                :menuitem type=help4help.
                :menuitem type=exthelp.
        :/menugroup.
    :/menugroup.
```

FIG.4A

```
:line.
    :entryf 'Part Number:' id=entryf1 width=10 qual=num range1=-2147483674.
    :list id=lst1 lines=2 width=15 text="Single--Column Listbox" dclick=help.
        :listitem id=slitm1 "List Box Item 1".
        :listitem id=slitm2 "List Box Item 2".
    :/list.
:/line.

:chkb 'CHKB1 -Enable/Disable CHKB2' id=chkb1 default=checked text.mnemon=1 enable=yes
initial_focus=no justify=left text.note="Translation Notes To The Translator"
text.label=CheckBox1.

:group 'Group 1' id=grp1 box=yes expand=horizontal layout=vert.
    :radiob "RB1" id=rb1 default=on enable=yes justify=left text.mnemon=1.
    :radiob 'RB2 - Add/Delete Items to List Box' id=rb2 enable=yes justify=left.
:/group.

:pb_fka type=save border=yes validate=yes.

:pb_fka "User Defined PB_FKA" id=pbmine.

:pb_fka type=help id=help.

:/windowdef.
```

FIG.4B

GRAPHICAL USER INTERFACE INCLUDING DYNAMIC SIZING AND SPACING

FIELD OF THE INVENTION

The invention relates to end-user tools for defining, creating, and editing graphical user interfaces. More particularly, the invention relates to creating, defining, editing, or otherwise modifying graphical object entries. Graphical object entries include the size and location of the object. A compiler compiles the graphical user interface source code file to form a graphical user interface object code file. As part of the editing process, preceding the compilation process, the editor updates the size and location object entries of each graphical object, dynamically sizing the size and location object entries in the editor's What You See Is What You Get (WYSIWYG) environment. The source file created by the editing process is compiled when the user builds a panel library.

CROSS REFERENCE TO RELATED APPLICATIONS

This application is related to the commonly assigned, copending, U.S. patent applications, filed on even date herewith:
1. Application of Robert P. Hoffmann, Jerry W. Malcolm, John D. Montgomery, and Steve S. Stone, for Graphical User Interface Including Dynamic Sizing and Spacing, Ser. No. 07/864,766 filed Apr. 7, 1992.
2. Application of John P. Barrett, Robert P. Hoffmann, and John D. Montgomery for Graphical User Interface Including Group Actions on What You See Is What You Get (WYSIWYG) Editor, Ser. No. 07/864,732 filed Apr. 7, 1992.
3. Application of John D. Montgomery and Scott A. Sylvester for Graphical User Interface Including Integration of What You See Is What You Get (WYSIWYG) Editor and Compiler, Ser. No. 07/864,767 filed Apr. 7, 1992.
4. Application of John P. Barrett, David M. Dapkiewicz, Robert P. Hoffmann, Jerry W. Malcolm, John Montgomery, and Scott A. Sylvester for Graphical User Interface Including User Control of What You See Is What You Get (WYSIWYG) Editor Objects, Ser. No. 07/863,819 filed Apr. 6, 1992.
5. Application of John P. Barrett, Robert P. Hoffmann, and John D. Montgomery for Graphical User Interface Including Updating of Multiple Panels Using What You See Is What You Get (WYSIWYG) Editor, Ser. No. 07/864,770 filed Apr. 7, 1992.
6. Application of Scott A. Sylvester for Graphical User Interface Including What You See Is What You Get (WYSIWYG) Creation of Action Bar, Ser. No. 07/864,775 filed Apr. 7, 1992.

BACKGROUND OF THE INVENTION

The user interface is the most visible part of a computer. It is the link between the application software and the end-user. Historically, user interfaces have been alpha-numeric character based user interfaces.

Graphical user interfaces utilize graphical objects to replace and/or supplement alpha-numeric user interfaces. In this way, graphical user interfaces enhance the end-user's and/or application programmer's productivity.

Graphical User Interfaces use graphical images to represent real world objects. A graphical user interface panel is shown in FIG. 1, denominated "Prior Art." The Graphical User Interface, 1, of FIG. 1 has a plurality of graphical images, 11, 21, and 31. These graphical images, 11, 21, and 31, also called icons, are smaller then the display size. This gives the graphical user interface panel, 1, the ability to simultaneously display multiple "windows" of text, 41, and images, 11, 21, and 31, on the same physical display, 1.

Graphical User Interfaces have the ability to employ both graphical inputs and alphanumeric inputs. Exemplary graphical inputs include "point and click" devices, mice, touch panels, "light pens," and the like. Exemplary alphanumeric inputs are keyboard inputs.

Graphical User Interfaces are more intuitive and easier to learn and use then keyboard alphanumeric inputs. This results in higher end-user productivity.

Notwithstanding their wide end-user acceptance and ease of use, graphical user interfaces have problems. Most significantly, Graphical User Interfaces are complex to program, i.e., they are difficult to define, create, and edit. Graphical user interface programming requires a high level of skill with a long learning curve.

Thus, a need exists for a Graphical User Interface editor that enables an end-user to define, create, or edit a Graphical User Interface. In order for an end-user to define, create, or edit a Graphical User Interface, the end-user needs the ability to use a What-You-See-Is-What-You-Get (WYSIWYG) editor and/or a text editor interchangeably and compile and save the resulting (edited or created) Graphical User Interface panel. This ability to define (create or revise a GUI panel) is lacking in the prior art. This is because the prior art graphical user interface editors do not maintain the integrity of the source file once manual updates are made with a text editor.

OBJECTS OF THE INVENTION

A primary object of the invention is to provide a Graphical User Interface editor that enables an end-user to define, create, or edit a Graphical User Interface.

A further object of the invention is to provide a user-friendly Graphical User Interface editor, that is, a Graphical User Interface editor that interchangeability utilizes a What-You-See-Is-What-You-Get (WYSIWYG) editor and/or a text editor interchangeably.

A further object of the invention is provide the end-user with the ability to compile and save the resulting (edited or created) GUI panel.

A still further object of the invention is provide the end-user with the ability to save the edited source code corresponding to the edited GUI panel. This enhances the ability of the end-user to further modify or edit, or even copy, the Graphical User Interface File.

SUMMARY OF THE INVENTION

These and other objects are obtained by the method of the invention. The invention provides end-user tools for defining, creating, and editing graphical user interfaces.

The invention provides a method for creating, defining, editing, or otherwise modifying graphical object entries. Graphical object entries include the size and location of the object. A compiler compiles the graphical user interface source code file to form a graphical user interface object code file. As part of the editing process, prior to the compilation process, the user uses the editor to dynamically update the size and location object entries of each graphical object in a What You See Is What You Get (WYSIWYG) environment, which results in dynamically sizing the panel and object size and location object entries.

According to the method of the invention, an end-user opens a graphical user interface source code file. This source code file contains an entry for the user interface panel and for each object, as an icon, an action bar, or the like, within the panel. The object entries include the size and location of the object. The user has the opportunity to update, edit, or revise the source code file. As part of the editing process the panel editor also dynamically updates the size and location object entries of each graphical object, dynamically sizing the panel and object size and location object entries. A compiler compiles the graphical user interface source code file to form a graphical user interface object code file.

THE FIGURES

The invention may be understood by reference to the FIGURES appended hereto.

FIGS. 4(A-B) are a listing of a portion of a user accessible tag file (.PDF).

Figure 5A:
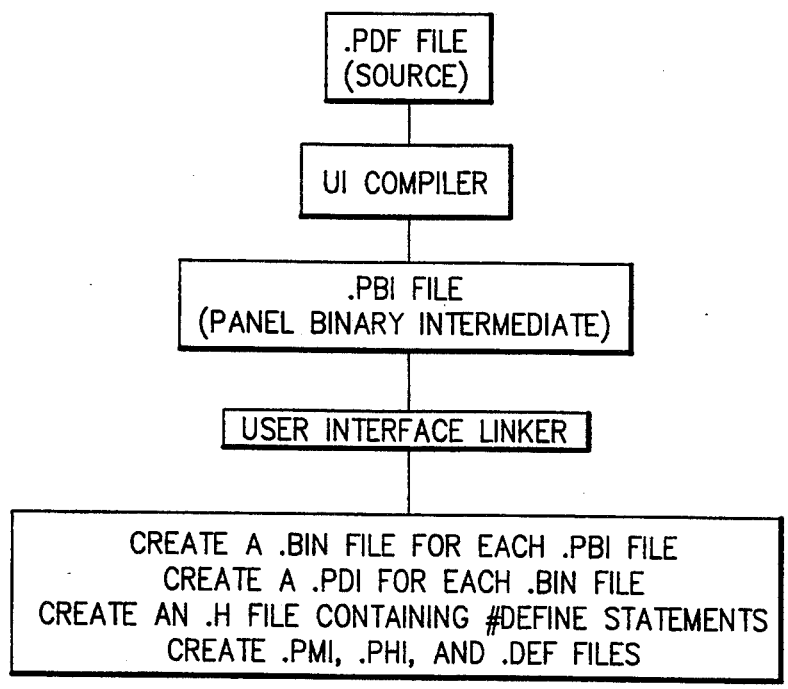
Figure 5B:
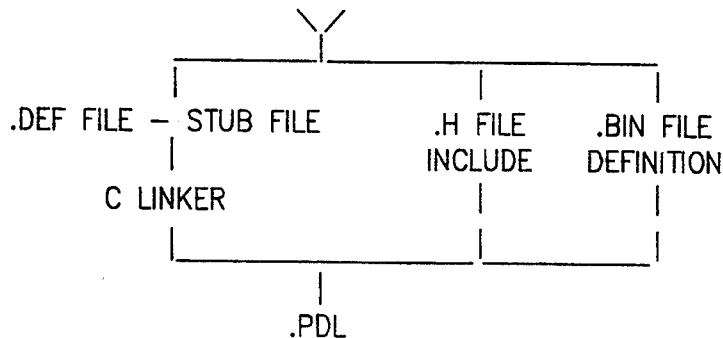
Figure 5C:
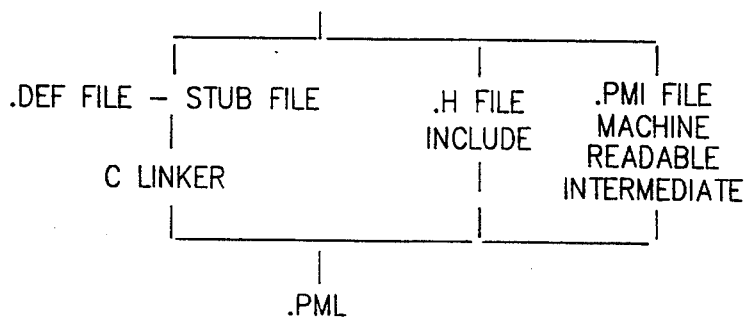

FIG. 5, including FIGS. 5A, 5B, and 5C are a representation of the modules and the process of the invention.

DETAILED DESCRIPTION OF THE INVENTION

According to the method of the invention User Interface (UI) panels are created and maintained using either a "What You See Is What You Get" (WYSIWYG) editor including panel definition (tag) language or a text editor.

System Overview

Figure 1:
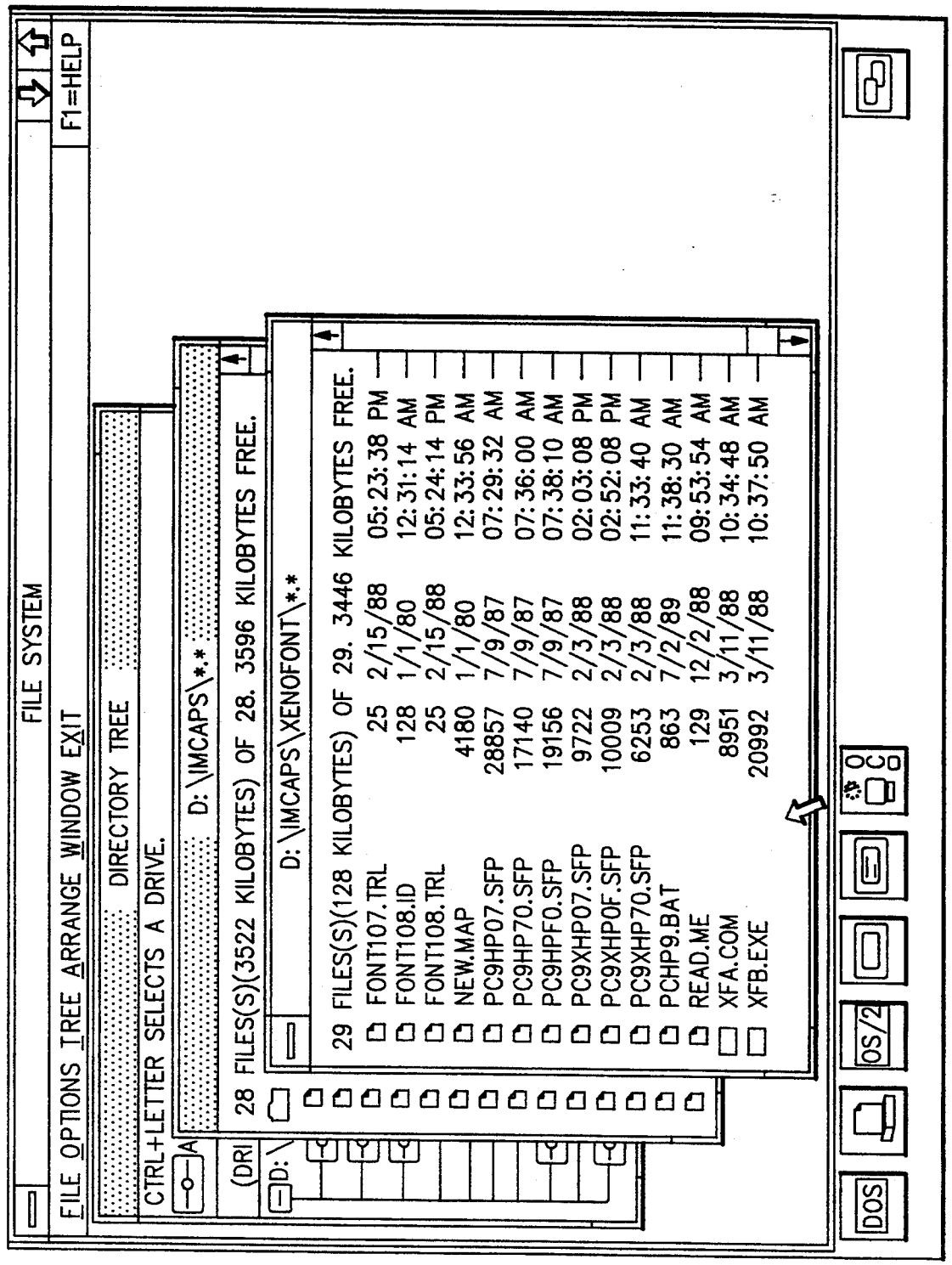
FIG. 1 is a representation of a Graphical User Interface. This FIGURE is denominated "Prior Art."
Figure 2:
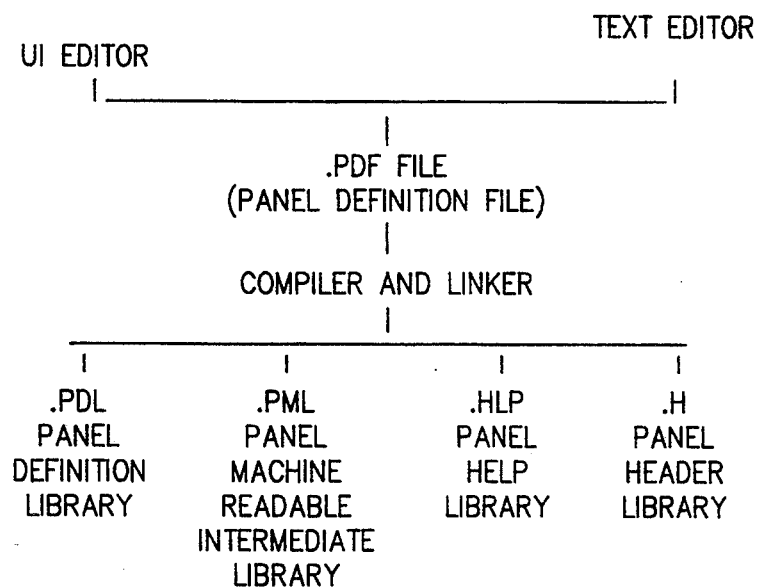
FIG. 2 is a graphical overview of a flow chart of the Graphical User Interface Editor of the invention.
Figure 3:
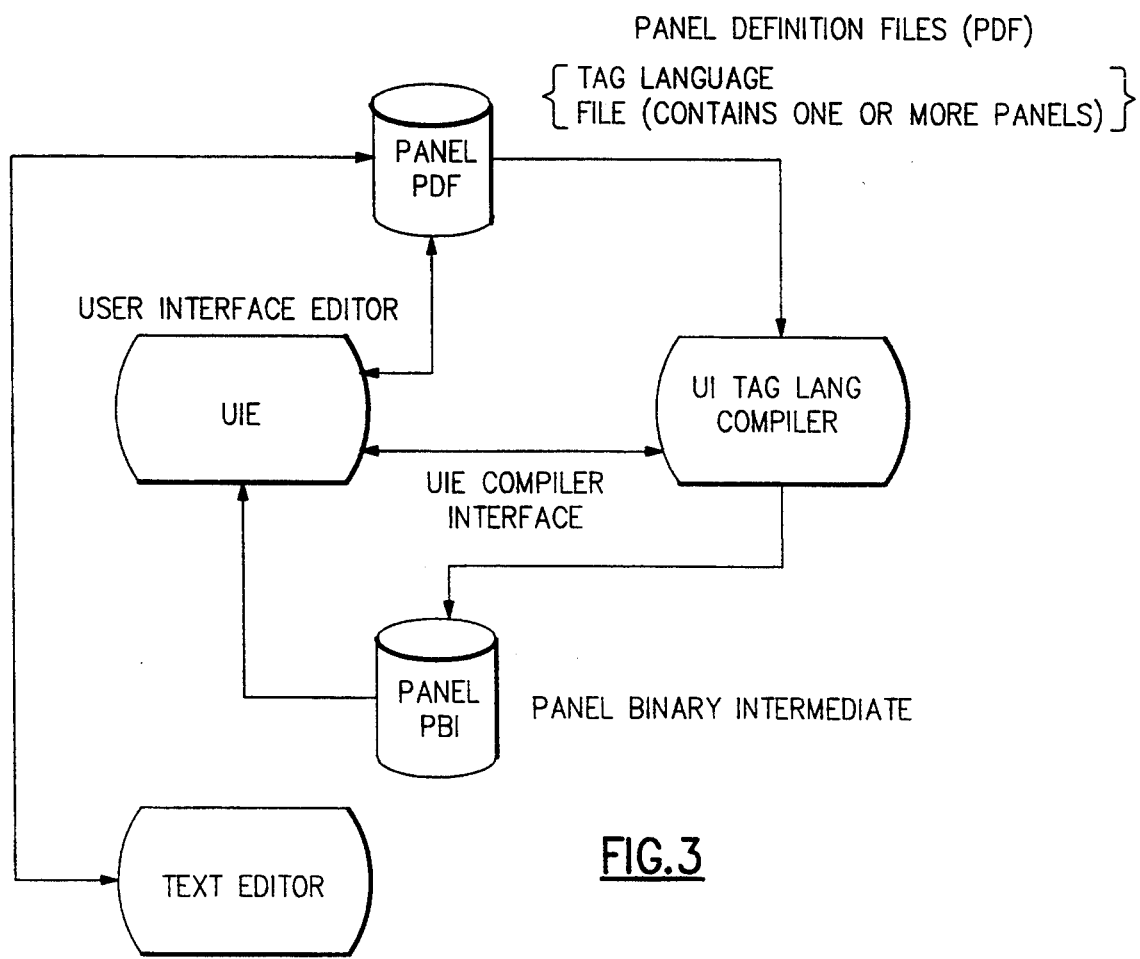
FIG. 3 is a representation of the modules and their relationship for the Graphical User Interface Editor of the invention.

As shown in FIGS. 2 and 3, a software interface is established between the Graphical User Interface Editor (GUIE) and the User Interface Compiler (UIC) joint by an Application Program Interface rather then a process call. The use of an Application Program Interface instead of a process call reduces overhead.

Using the Graphical User Interface Editor (GUIE) or a text editor, the end-user can create compilable and storable GUI source files. These source files contain tag language which defines Graphical User Interface (GUI) panels. The tag language files are the only input to and output of the GUIE. Tag language files can be generated by the GUIE, modified with a text editor, read back to the GUIE, and then compiled in the user interface compiler (UIC). Any such modifications will be preserved (by the software link between the GUIE and the UIC) and contained in the tag language file that is created by GUIE. This maintains the integrity of the source file regardless of how it is edited. This process can be repeated as many times as necessary, providing maximum flexibility to the user in creating and modifying panels.

The components of the system include the User Interface Editor (UIE), the build time tools including a panel definition language, a panel language compiler and linker, and a run time support package. The build time tools include a What You See Is What You Get (WYSIWYG) panel creation editor. A WYSIWYG panel creation editor allows fast panel creation through the use of direct user manipulation of panel objects represented by icons. This assists the application builder, that is, the end-user, with the layout of the panel, allowing the end-user to concentrate on the panel layout instead of panel formatting details.

The panel definition language, as disclosed in FIGS. 4A-4B, is the method of creating the panel definitions. As utilized herein, the panel definition language is tag language.

The panel language compiler and linker is a tool that reads and writes panel definition files, so that these files can be created and/or updated with a text editor and read back into the WYSIWYG tool. The compiler and linker works by integrating the WYSIWYG panel creation editor and Panel definition language, converting the panel definition language files to a set of intermediate files which allow the separation and isolation of panel text. The compiling and linking function is the key to enabling support of various graphical user interface platforms. The panel language linker combines groups of platform independent intermediate files into platform specific run time panel definitions.

The run time support is a client-server architecture where one copy of the UI server is loaded onto each UI display node. Application programs can request UI support services concurrently from local and remote UI servers through the use of a single, high function Application Program Interface (API). The UI operational parameters, such as the destination UI server name and the panel library names are contained in a UI control block located on the same node as the UI client application. The control block allows run time modification of the client application UI parameters without modification to the application.

The UI run time object set includes panels (windows) and message boxes, and any of the controls such as list boxes and entry boxes that can be placed in a panel. Each object is characterized by one or more attributes, such as display properties, text, entry characteristics, and user data.

The panel Action UI request enables the client application to perform data exchange actions (set, query, update) on all objects as well as immediate control actions such as lock/unlock and hide/show on panel objects.

The UI API contains a Connection Group-connect/disconnect function. This is because a client application can concurrently use the display services of more then one UI server, a client application first establishes a unique session with a destination UI server.

The User Interface Application Program Interface (UI API) also includes a Display Group- get panel, display panel, panel action, display message box function. This function enables an application to request that a panel be loaded into memory by a UI server, perform data exchange and immediate control actions on the objects, display the panel, and display message services.

The User Interface Application Program Interface (UI API) also includes a User Exit Group. This function sets the user exit, and processes the user exit event. The user exits enable the application program to be notified immediately of user initiated panel actions. This request sets a user exit at the panel or control object level. Using user exits, the UI portion of the application can be constructed in a modular fashion maximizing code reuse.

The method of the invention utilizes a tag language source code file to define a Graphical User Interface (GUI) panel. A source code tag language file, that is a .PDF file, that the WYSIWYG editor produces is shown in FIG. 4. To be noted is that each entry from the colon, ":", to the period, ".", is a single tag.

These tag files (.PDF files) are internally joined together in the form of a linked list. An exemplary linked list is shown in Table I.

TABLE I

Linked List

| Address | Object Type | Size (x,y) | Location (x,y) | Text | Pointer To Next Object |
|---|---|---|---|---|---|
| 1 | Windowdef | 50,50 | 0,0 | Panel A | 2 |
| 2 | Checkbox | 2,7 | 10,10 | Option A | 3 |
| 3 | Checkbox | 2,7 | 20,10 | Option B | 4 |
| 4 | Ewindowdef | 0,0 | 0,0 | | 0 |

Looking at Table I, it is seen that the a window is defined, Windowdef, as Panel A, it is of size 50 by 50, and is located at 0,0. The tag file defining the window is Panel A. The next item in the linked list is at address 2 of the list. It is the Checkbox of size 2 by 7 at 10, 10, having the tag file Option A. The next item on the linked list is at address 3. This is another checkbox, of size 2 by 7, located at 20,10, and defined by text file Option B. The next item on the linked list is the Ewindowdef.

The end-user can edit this tag language source code file with a graphical What-You-See-Is-What-You-Get (WYSIWYG) editor and/or a text editor interchangeably. The method of the invention compiles and saves the resulting (edited or created) GUI panel, providing both a source code GUI panel file and an object code GUI file. This maintains the integrity of the GUI source code file after manual updates have been made with a text editor.

The User Interface Compiler-Linker

The User Interface Compiler compiles the panel defining tag files to yield PBI files. Exemplary pseudo-code is:
Compiler reads the file.
Compiler parses the tags and calls the tag method to build the object lists.
Compiler writes the object lists to the PBI file.

The ability to create, define, edit, and modify panels in tag language, and then compile the source code Tag files to object code, saving both the source code and the object code, is made possible by fully integrating the GUIE and the UIC through the software link therebetween.

Utilizing this software link, when a tag language file is read in to GUIE, it invokes UIC. The UIC converts the source tags to a binary representation, and writes it to a file. The GUIE then reads this binary file into a structure in memory and uses it to keep track of all panel updates made by the user. When all desired modifications have been completed, UIE creates source tags from the binary data structure and writes them to a user-specified file.

The resulting system, supporting text and graphical images, is an easy to learn and easy to use client-server graphical user interface function. It provides a highly productive environment for developing and maintaining GUI's and user interface application panels and software through the full life cycle of an application program. The Graphical User Interface system of the invention is a graphical user interface supporting an asynchronous, event driven style of programming.

The Graphical User Interface Source Code File and Graphical User Interface Editor The Graphical User Interface Editor (GUIE) is a visual interface where windows, message boxes, and controls are represented by icons. By using a mouse, touch panel, or arrow keys, the user moves controls into windows and message boxes. After moving the controls, attributes are assigned to the controls. This action results in the definition, creation, or modification of a Panel Definition File (.PDF). It should also be noted that the end-user can also use the User Interface editor to display or modify any source tags stored in a .PDF file that was built using a text editor. The user can use any text editor to build windows, message boxes, and controls. For example, the end-user can create a window or a message box by typing :windowdef or :message, as appropriate. In this way, the user can use a text editor to display or modify any source tags store in a Panel Definition File (.PDF) using either the User Interface Editor or a text editor.

The next step is saving the Panel Definition File (.PDF), e.g., a panel definition file containing a window or a message box. The save action automatically converts the window or message box being saved into source tag that contain the definitions needed by the UI tools to create a window or message box.

When the user then opens a Panel Definition File (.PDF) that was built using either the User Interface Editor or the text editor, the "open" action cause the source tags stored in the Panel Definition File (.PDF) to be compiled and displayed as a window or message box.

The panels are defined using tags. Tags are one or more characters attached to a set of data that contain information about the set, including its identification. A tag can be a lexical unit that names a language object; for example, the names of variables, arrays, records, labels, and procedures. Alternatively, a tag can be a set of bits or characters that identifies various conditions about data in a file. These bits or characters, when present, are often found in the header records of such files; a name-label, mnemonic - assigned to a data structure, such as a file, field, paragraph, or other object.

A "tag" consists of a specific tag name along with any required or optional parameters. The user can add controls to a window or message box by typing control control tags within window definition tags or message box definition tags.

TAG Types include:

Compiler Tags—Compiler Tags specify information to the compiler. This information can be used either to control the compiler or to specify information that is referenced by other tags. Compiler tags include help text definition tags, help text tags, label definition tags, resource definition tags, text string definition tags, and user interface definition file identifiers.

Message Box and Window Definition Tags—Message Box and Window Tags specify the beginning and end of either a message box or a window.

Layout Tags—Layout tags specify the column and row arrangement or other layout information for the controls in a window definition. Layout tags include column, division, line mode, window scale factor, space, and subitem tags.

Control Tags—Control tags specify the actual contents that appear in a window definition, and specify the controls that appear in a message box. Window definition control tags include check box, column heading, column heading group, combination box, drop down combination box, drop down list, entry field, group, icon, list, list item, menu item group, menu item, output field, function key area push button, push button, radio button, and static text. Message box definition tags include message box push button and message text.

A window or message box is defined by a series of tags. A tag consists of the specific tag name plus any required and optional parameters. One tag structure is:

:tagname parameter=value parameter=value
parameter=value

The Panel Definition File (.PDF), and the tags that make it up have certain characteristics. First, each new tag starts on a separate line. Second, blank lines are ignored. Third, tags and parameters are not case sensitive. Fourth, each tag starts with a leading colon. Fifth, each tag line can wrap to multiple lines in a panel definition file, .PDF. Sixth, leading spaces on the tag line are ignored, even if the source line is split in the middle of a quoted string. Seventh, the tag line is always terminated with a period.

Block tags are used in pairs. They are typically used to enclose a collection of other tags. The end tag is defined the same as the start tag but with a preceding forward slash. That is, if "WINDOWDEF" is the start tag for a block, e.g., a window definition block, then "/WINDOWDEF" is the end tag for the block.

An existing window or message box is made up of source tags that are stored in a .PDF file. "Opening" the .PDF file causes the source tags residing in the .PDF file to be compiled and displayed as a window or message box. A "Save" action causes the source tags to be written to a .PDF file. The .PDF file must include an entry for the total panel, an entry for each object within the panel, and a linked list connecting the entries for each sub-object nested within a larger object. In the linked list each entry has a field containing the next entry in the list.

According to the invention described herein, dynamic sizing and spacing of the objects is provided in a What You See Is What You Get (WYSIWYG) environment at edit time. That is, the size of windows and controls is automatically set by the UIE (User Interface Editor). The windows grow and shrink under the UIE.

The method of the invention provides a user interface editor (UIE) that allows the user to construct or modify a panel definition by using a mouse to move objects into, out of, or within a panel. When these panels are displayed at run time, the User Interface (UI) invokes Dynamic Creation to size and space the panel and its objects. The UIE also invokes Dynamic Creation during its processing so that the user can see, in real time, exactly how the panel being built will look at run time. Access to this routine from UIE gives this function to the user in a What You See Is What You Get (WYSIWYG) environment in real time.

When objects are moved into or out of a panel, the size of the panel is dynamically increased or decreased to accommodate its new contents. The size of a panel can also be modified by changing the length of its title. The size an object is increased or decreased dynamically based on the attributes given to it using UIE. The size of some objects (e.g. Pushbutton) is determined by the size of the text associated with them. For example, the size of a pushbutton containing the word "OK" will be smaller than one containing the word "Cancel". The size of other objects (e.g. Entry Field) is determined by the the value of its parameters. For example, the size of an entry field can be modified by updating the value of its WIDTH parameter. The spacing between objects on a panel is determined by the parameters assigned to the objects and by the existence of objects known as "layout" objects. Example layout objects are:

LINE—All objects within the bounds of a Line are concatenated horizontally.

COLUMN—All objects within the bounds of a Column are aligned vertically.

The layout objects are visible when using UIE but are not visible at runtime. An additional function of UIE is called the "Play" option. When the user selects the Play option for a panel, the layout objects are made invisible. The panel is then displayed as it will look at runtime.

All of this sizing and spacing function happens automatically, with no user intervention required (with the exception of the Play option), each time an update is made to a panel.

The sizing and spacing function starts every time an update is made to the binary linked list that defines the panel. An exemplary linked list shown in Table I, with modification entered by the user, is shown in Table IA, below.

TABLE IA

| | | Linked List | | | |
|---|---|---|---|---|---|
| Address | Object Type | Size (x,y) | Location (x,y) | Text | Pointer To Next Object |
| 1 | Windowdef | 50,50 | 0,0 | Panel A | 5 |
| 5 | Checkbox | 2,5 | 10,10 | Option A | 6 |
| 6 | Checkbox | 2,10 | 20,10 | Option C | 4 |
| 4 | Ewindowdef | 0,0 | 0,0 | | 0 |

Looking at Table IA, it is seen that the a window is defined, Windowdef, as Panel A, it is of size 50 by 50, and is located at 0,0. The tag file defining the window is Panel A. The next item in the linked list is at address 5 of the list. It is the Checkbox reduced in size from 2 by 7 to by 5, still located at 10, 10, having the tag file Option A. The next item on the linked list is at address 6. This is another checkbox, now of size 2 by 10, located at 20,10, and defined by text file Option C. The next item on the linked list is the Ewindowdef.

This update could be moving an object or changing an attribute of an object.

This includes the steps of:

Get binary linked list representing the panel.

Get play option indicating whether or not the "Play" option is in effect.

Output updates linked list with the updated size and location information.

Paint each object in the linked list onto the screen with its new size and location information.

Dynamic sizing and spacing is accomplished by maintaining a binary structure in UIE which contains an entry for the panel and for each object with the panel. This structure contains all the attributes for each object as well as its size and location. Each time the user makes an update to a panel, either by moving an object or changing one of its attributes, UIE updates the binary structure with the corresponding update and passes it to the Dynamic Creation routine. Based on the values of all the objects within the binary structure, Dynamic Creation assigns size and location attributes to each object and the panel itself, just as it does at runtime. UIE receives the updated binary structure and "repaints" the panel and its objects with the new size and spacing information.

The Play option is accomplished by passing a parameter to Dynamic Creation stating that the Play option is in effect. Layout objects are given a size of zero, thus making them invisible when the panel is re-painted.

The UIE user sees the results of these routines in real time as the panels are constructed. This allows the end-user to concentrate on the content of the panels rather than on formatting details.

COMPILING THE GRAPHICAL USER INTERFACE SOURCE CODE FILE TO OBTAIN A GRAPHICAL USER INTERFACE OBJECT CODE FILE

The relationship of the file types and the steps of the invention is shown with particularity in FIG. 5, including FIGS. 5A, 5B, and 5C.

The .PDF files are created by the end-user using the Graphical User Interface Editor or a text editor. The UI compiler converts the Panel Definition Files (.PDF) into into Panel Binary Intermediate Files (.PBI). The User Interface Linker is then called. The User Interface Linker creates files containing panel definition information. These include the following file types:

.BIN For each .PBI file a .BIN file is created containing binary instructions for building the panel.

.PDI One .PDI—Panel Definition Intermediate—file is created containing an "include" statement for each of the .BIN files and resource files defined in the .PDF files.

.H One .H file is created containing #DEFINE statements for all of the controls, text strings, help panels, etc. defined in the panel. This file is used in subsequent build process steps. The .H file is included in the application used with the UI component.

.PMI One .PMI (Panel Machine Readable Information) file, which is machine readable, is created containing all of the text for all of the panels.

.PHI One .PHI (Panel Help Intermediate) file is created containing all of the help panel text for all of the help panels.

.DEF Two temporary .DEF (Definition) files are created for use in subsequent build process steps.

In FIG. 5B, the .DEF files and the STUB file are linked with the LINKER, and the .BIN file output, the .PDI file, and the .H file are compiled, to create a .PDL (panel definition library) file.

In FIG. 5C the .DEF files and the STUB file are linked with the LINKER, and the .PMI file output, and the .H file are compiled, to create a .PML (panel message library) file.

The resulting output is then stored in a suitable file.

Thus, according to the invention there is provided a Graphical User Interface editor that enables an end-user to define, create, or edit a Graphical User Interface. This is accomplished by a user-friendly Graphical User Interface editor, that is, a Graphical User Interface editor that interchangeability utilizes a What-You-See-Is-What-You-Get (WYSIWYG) editor and/or a text editor interchangeably.

The graphical user interface editor of the invention provides the end-user with the ability to compile and save the resulting (edited or created) GUI panel, including the end-user with the ability to save the edited source code corresponding to the edited GUI panel. This enhances the ability of the end-user to further modify or edit, or even copy, the Graphical User Interface File.

While the invention has been described and illustrated with respect to certain preferred embodiments and exemplifications, it is not intended to limit the scope of the invention thereby, but solely by the claims appended hereto.

We claim:

1. A method of doing one or more of defining, creating, or editing a graphical user interface panel file comprising:
   a. opening a graphical user interface source code file containing an object entry for the user interface panel and for each object within the panel, said object entries including the size and location of the object;
   b. editing the graphical user interface source code file to form an edited graphical user interface source code file, and update the size and location source entries of each object;
   c. compiling the edited graphical user interface source code file; and
   d. storing the compiled graphical user interface object code file in a Panel Binary Intermediate file.

2. The method of claim 1 comprising dynamically sizing the size and location entries in the graphical user interface source code file during editing in a What You See Is What You Get environment.

3. A method of doing one or more of defining, creating, or editing a graphical user interface panel source code file comprising:
   a. opening a graphical user interface source code file containing an object entry for the user interface panel and for each object within the panel, said object entries including the size and location of the object;
   b. editing the graphical user interface source code file to form an edited graphical user interface source code file, and dynamically update the size and location source entries of each object;
   c. compiling the edited graphical user interface source code file;
   d. storing the compiled graphical user interface object code file in a Panel Binary Intermediate file; and
   e. storing the edited graphical user interface source code file which contains tag language defining the graphical user interface panels in the form of a linked list.

* * * * *